United States Patent
Bansal et al.

(10) Patent No.: US 12,265,792 B2
(45) Date of Patent: Apr. 1, 2025

(54) GENERATING COMMONSENSE CONTEXT FOR TEXT USING KNOWLEDGE GRAPHS

(71) Applicant: ADOBE INC., San Jose, CA (US)

(72) Inventors: Rachit Bansal, New Delhi (IN); Milan Aggarwal, Delhi (IN); Sumit Bhatia, New Delhi (IN); Jivat Neet Kaur, Delhi (IN); Balaji Krishnamurthy, Nodia (IN)

(73) Assignee: Adobe Inc., San Jose, CA (US)

( * ) Notice: Subject to any disclaimer, the term of this patent is extended or adjusted under 35 U.S.C. 154(b) by 269 days.

(21) Appl. No.: 17/526,824

(22) Filed: Nov. 15, 2021

(65) Prior Publication Data

US 2023/0153534 A1 May 18, 2023

(51) Int. Cl.
*G06F 40/295* (2020.01)
*G06F 16/332* (2019.01)
*G06F 16/3329* (2025.01)
*G06N 20/00* (2019.01)

(52) U.S. Cl.
CPC ........ *G06F 40/295* (2020.01); *G06F 16/3329* (2019.01); *G06N 20/00* (2019.01)

(58) Field of Classification Search
CPC ..... G06F 16/3329; G06N 20/00; G06N 5/022
See application file for complete search history.

(56) References Cited

U.S. PATENT DOCUMENTS

| 7,519,529 B1* | 4/2009 | Horvitz | G06F 16/35 |
| | | | 369/30.04 |
| 11,210,590 B2* | 12/2021 | Boxwell | G06N 5/025 |
| 11,526,678 B2* | 12/2022 | Perez | G09B 7/02 |
| 2004/0260694 A1* | 12/2004 | Chaudhuri | G06F 16/215 |
| | | | 707/999.005 |
| 2007/0203863 A1* | 8/2007 | Gupta | G06N 20/00 |
| | | | 706/20 |
| 2019/0065576 A1* | 2/2019 | Peng | G06F 16/285 |

(Continued)

OTHER PUBLICATIONS

Dognin et al. "DualTKB: A Dual Learning Bridge between Text and Knowledge Base". arXiv:2010.14660v1 [cs.CL] Oct. 27, 2020 (Year: 2020).*

(Continued)

*Primary Examiner* — Jesse S Pullias
(74) *Attorney, Agent, or Firm* — Shook, Hardy & Bacon L.L.P.

(57) ABSTRACT

Methods and systems are provided for facilitating generation and utilization of a commonsense contextualizing machine learning (ML) model, in accordance with embodiments described herein. In embodiments, a commonsense contextual ML model is trained by fine-tuning a pre-trained language model using a set of training path-sentence pairs. Each training path-sentence pair includes a commonsense path, identified via a commonsense knowledge graph, and a natural language sentence identified as contextually related to the commonsense path. The trained commonsense contextualizing ML model can then be used to generate a commonsense inference path for a text input. Such a commonsense inference path can include a sequence of entities and relations that provide commonsense context to the text input. Thereafter, the commonsense inference path can be provided to a natural language processing system for use in performing a natural language processing task.

19 Claims, 7 Drawing Sheets

(56) References Cited

U.S. PATENT DOCUMENTS

| | | | |
|---|---|---|---|
| 2021/0117509 A1* | 4/2021 | Aditya | G06F 40/30 |
| 2021/0191988 A1* | 6/2021 | Galitsky | G06N 5/045 |
| 2022/0230625 A1* | 7/2022 | Zhu | G10L 15/063 |
| 2022/0335219 A1* | 10/2022 | Sengupta | G06N 3/042 |

OTHER PUBLICATIONS

Chris van den Berg. 2017. "Super Fast String Matching in Python". web.archive.org/web/20171102084304/https://bergvca.github.io/2017/10/14/super-fast-string-matching.html (Year: 2017).*

Jagvaral et al. "Path-based reasonin approach for knowledge graph completion using CNN-biLSTM with attention mechanism". Expert Systems with Applications 142, (2020), 112960 (Year: 2020).*

Ji et al. "Language Generation with Multi-Hop Reasoning on Commonsense Knowledge Graph". arXiv:2009.11692v1 [cs.CL] Sep. 24, 2020 (Year: 2020).*

Bansal, R., et al., "CoSe-Co: Sentence Conditioned Generative CommonSense Contextualizer for Language Models," Automated Knowledge Base Construction, pp. 17 (2021).

Bao, J., et al., "Constraint-based question answering with knowledge graph," In Proceedings of COLING 2016, the 26th International Conference on Computational Linguistics: Technical Papers, pp. 2503-2514 (2016).

Bhagavatula, C., et al., "Abductive commonsense reasoning," arXiv preprint arXiv:1908.05739, pp. 15 (Aug. 15, 2019).

Bosselut, A., et al., "Comet: Commonsense transformers for automatic knowledge graph construction," arXiv preprint arXiv:1906.05317, Accepted to ACL 2019, pp. 18 (Jun. 14, 2019).

Bosselut, A., et al., "Dynamic neuro-symbolic knowledge graph construction for zero-shot commonsense question answering," The Eleventh Symposium on Educational Advances in Artificial Intelligence, EAAI 2021, Virtual Event, pp. 4923-4931 (Feb. 2-9, 2021).

Feng, Y., et al., "Scalable multi-hop relational reasoning for knowledge-aware question answering," In Proceedings of the 2020 Conference on Empirical Methods in Natural Language Processing (EMNLP), Anthology ID: 2020.emnlp-main.99, pp. 1295-1309 (Nov. 2020).

Huang, L., et al., "Cosmos QA: Machine reading comprehension with contextual commonsense reasoning," In Proceedings of the 2019 Conference on Empirical Methods in Natural Language Processing and the 9th International Joint Conference on Natural Language Processing (EMNLP-IJCNLP), pp. 2391-2401 (2019).

Lin, B.Y., et al., "KagNet: Knowledge-aware graph networks for commonsense reasoning," In Proceedings of the 2019 Conference on Empirical Methods in Natural Language Processing and the 9th International Joint Conference on Natural Language Processing (EMNLP-IJCNLP), pp. 2829-2839 (2019).

Lv, S., et al., "Graph-based reasoning over heterogeneous external knowledge for commonsense question answering," Proceedings of the AAAI Conference on Artificial Intelligence, vol. 34, No. 05, pp. 8449-8456 (Apr. 2020).

Mitra, A., et al., "Exploring ways to incorporate additional knowledge to improve natural language commonsense question answering," arXiv preprint arXiv:1909.08855, pp. 8 (Sep. 19, 2019).

Niven, T., and Kao, H.-Y., "Probing neural network comprehension of natural language arguments," In Proceedings of the 57th Annual Meeting of the Association for Computational Linguistics, Anthology ID: P19-1459, pp. 4658-4664 (Jul. 2019).

Ren, H., and Leskovec,J., "Beta embeddings for multi-hop logical reasoning in knowledge graphs," Advances in Neural Information Processing Systems, vol. 33, retrieved from Internet URL https://proceedings.neurips.cc/paper/2020/file/e43739bba7cdb577e9e3e4e42447f5a5-Paper.pdf, pp. 11 (2020).

Ren, H., et al., "Query2box: Reasoning over knowledge graphs in vector space using box embeddings," In International Conference on Learning Representations, pp. 17 (2020).

Sap, M., et al., "Atomic: An atlas of machine commonsense for if-then reasoning," In Proceedings of the AAAI Conference on Artificial Intelligence, vol. 33, pp. 3027-3035 (2019).

Speer, R., et al., "Conceptnet 5.5: An open multilingual graph of general knowledge," In Proceedings of the AAAI Conference on Artificial Intelligence, vol. 31, pp. 4444-4451 (2017).

Sun, H., et al., "Open domain question answering using early fusion of knowledge bases and text," In Proceedings of the 2018 Conference on Empirical Methods in Natural Language Processing, pp. 4231-4242 (2018).

Wang, P., et al., "Connecting the dots: A knowledgeable path generator for commonsense question answering," Proceedings of the 2020 Conference on Empirical Methods in Natural Language Processing: Findings, EMNLP 2020, pp. 4129-4140 (2020).

Wang, X., et al., "Improving natural language inference using external knowledge in the science questions domain," Proceedings of the AAAI Conference on Artificial Intelligence, vol. 33, No. 01, pp. 7208-7215 (Jul. 2019).

Yasunaga, M., et al., "Qa-gnn: Reasoning with language models and knowledge graphs for question answering," In Proceedings of the 18th Meeting of the North American Association for Computational Linguistics (NAACL), pp. 535-546 (2021).

Zellers, R., et al., "Swag: A large-scale adversarial dataset for grounded commonsense inference," In Proceedings of the 2018 Conference on Empirical Methods in Natural Language Processing, pp. 93-104 (2018).

Zhou, P., et al., "RICA: Evaluating robust inference capabilities based on commonsense axioms," arXivpreprint arXiv:2005.00782, Accepted in EMNLP 2021 main conference, pp. 14 (Sep. 23, 2020).

* cited by examiner

GENERATING COMMONSENSE CONTEXT FOR TEXT USING KNOWLEDGE GRAPHS

BACKGROUND

Natural language models perform various natural language processing tasks. For example, some natural language models are generated to perform natural language generation that can be used for question-answering, chatbots, and/or machine translation. Such natural language models, however, often lack common sense. Accordingly, existing natural language models may fail on tasks that would be considered trivial to humans. In particular, a human would be able to recognize an appropriate context based on commonsense knowledge, whereas conventional natural language models fall short on identifying such commonsense context. As such, natural language models would benefit from efficient generation of augmented commonsense knowledge to perform accurately on natural language processing tasks and produce more accurate and sensible natural language output.

SUMMARY

Embodiments of the present technology are directed towards generating and using a commonsense contextualizing model to infer or identify commonsense context for sentences. In this regard, based on an input text, the commonsense contextualizing model can generate or output commonsense context for the input text. The commonsense context can be subsequently used, along with the input text, to subsequently perform various natural language processing tasks, such as, for example, question-answering, chatbots, and/or machine translation. By augmenting input (e.g., sentences) with commonsense context, such downstream natural language processing tasks can efficiently produce more correct and sensible natural language output.

To efficiently identify commonsense context, a commonsense contextualizing model can be generated to output commonsense context or knowledge given a natural language sentence, or other text, as input. The generated commonsense context is generally in the form of a commonsense path that includes a sequence of entities connected via relations. The relations can be determined based on a knowledge graph schema used for training the commonsense contextualizing model. As the commonsense contextualizing model outputs commonsense context conditioned on an input text, the model can dynamically select entities from the input text as well as generate novel unseen entities relevant to the sentence while conditioning them to the commonsense path being generated.

DETAILED DESCRIPTION

Figure 1:
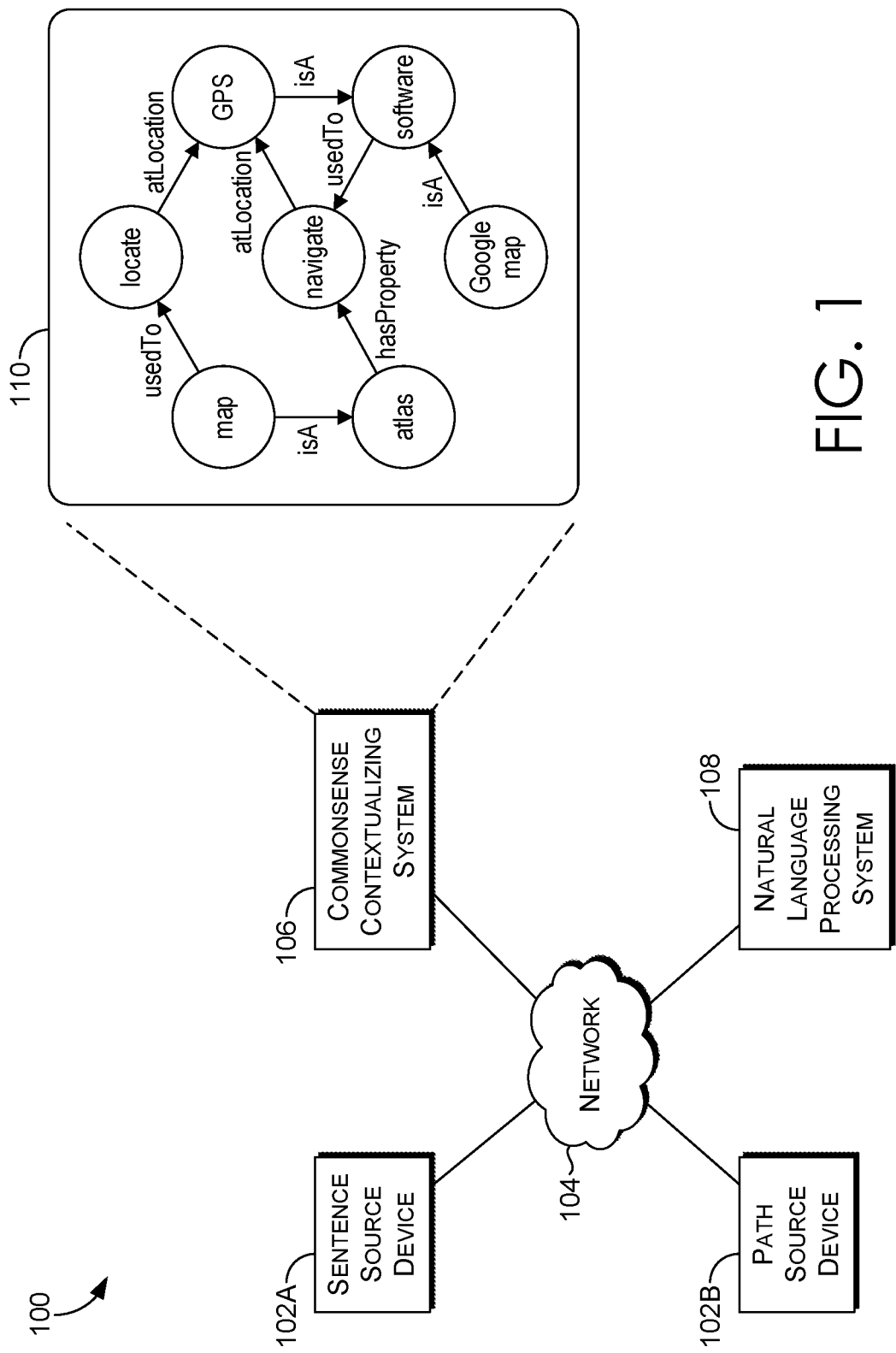
FIG. 1 depicts a diagram of an environment in which one or more embodiments of the present disclosure can be practiced, in accordance with various embodiments of the present disclosure.

Many natural language models exist to achieve a variety of natural language processing tasks. For example, some natural language models are generated to perform natural language generation that can be used for question-answering, chatbots, and/or machine translation. Although many natural language models can capture linguistic nuances and syntactical knowledge, the models often lack common sense and, as such, may fail on tasks that would be considered trivial to humans. By way of example, assume a natural language generation model is expected to generate natural language text based on an input text string. Further assume such a natural language generation model is provided with an input sentence of "It is raining outside, let me take a _____." In completing the sentence, the natural language generation model may produce "look" as a most confident completion for the sentence as the phrase "take a look" was used numerous times during training. However, a human would be able to recognize a more appropriate word, such as "umbrella" or "raincoat" based on commonsense knowledge. As such, language models would benefit from use of augmented commonsense knowledge to make them more robust, perform accurately on natural language processing tasks, and produce more accurate and sensible natural language output.

Some conventional technologies have made attempts to leverage structured knowledge present in commonsense knowledge graphs. Such technologies have focused on learning a model to generate knowledge on-demand or solving a particular downstream task by retrieving commonsense knowledge from a knowledge graph. For example, one conventional technology learns commonsense knowledge to generate concepts on-demand, but the applicability of the generated concepts to a downstream task is challenging. In particular, such methods learn commonsense knowledge through training on concepts in a knowledge graph (symbolic text in form of knowledge graph triples) but perform inferences on sentences. Such an implementation, however, results in an input distribution shift between the model training and model inference performance. On the other hand, another conventional technology performs task-specific methods (e.g., question and answer-graph neural networks (QA-GNN)). Such technologies typically use an architecture that relies on the structure of the downstream task, such as question-answering, to leverage the static knowledge in a knowledge graph and, as such, does not generalize well beyond the specific task. Further, being conditioned only on singleton question-choice entity pairs at a time, the output does not capture the overall context of the question. Accordingly, two distinct questions can produce very similar output for the same answer choices.

Moreover, to achieve some level of accuracy in models trained in such conventional technologies, an extensive amount of training is performed, thereby resulting in a significant use of resources. For example, to achieve accuracy of over 60%, conventional technologies generally use more than 60% of a training data set (as compared to only 20% of the training data set needed to achieve more than 60% accuracy with the embodiments described herein). Accordingly, a significant amount of computing resources are utilized in performing training of conventional models.

Accordingly, embodiments of the present technology are directed to generating and using a commonsense contextualizing model to infer or identify commonsense context for sentences. In this regard, based on an input text, the commonsense contextualizing model can generate or output commonsense context for the input text. The commonsense context can be subsequently used, along with the input text, to subsequently perform various natural language processing tasks, such as question-answering, chatbots, and/or machine translation. By augmenting input (e.g., sentences) with commonsense context, such downstream natural language processing tasks can efficiently produce more correct and sensible natural language output.

To efficiently identify commonsense context, a commonsense contextualizing model can be generated to output commonsense context or knowledge given a natural language sentence, or other text, as input. The generated commonsense context can be in the form of a commonsense path that includes a sequence of entities connected via relations. The relations can be determined based on a knowledge graph schema used for training the commonsense contextualizing model. As the commonsense contextualizing model outputs commonsense context conditioned on an input text, the model can dynamically select entities from the input text as well as generate novel unseen entities relevant to the sentence while conditioning them to the commonsense path being generated.

In operation, to train a commonsense contextualizing model, training path-sentence pairs can be generated and used during training. A training path-sentence pair generally refers to a sentence paired or matched with a path (i.e., sequence of entities and relations) that is identified as relevant to the sentence. To identify path-sentence pairs, training sentences obtained from a source (e.g., Wikipedia®) can be identified as relevant for a training path identified from a commonsense knowledge graph (e.g., ConceptNet). As described herein, query templates can be used to query and/or identify a sentence(s) relevant to a path. This creation of training path-sentence pairs can be applicable to other knowledge graphs and sources, and is not intended to be limited herein. The training path-sentence pairs can be used to then train the commonsense contextualizing model.

In some embodiments, training the commonsense contextualizing model is based on a pre-trained language model. A pre-trained language model generally refers to a language model previously trained to learn usage of various words and language. In some cases, the language model can be fed a large amount of unannotated data for training. The training path-sentence pairs can be input to the commonsense contextualizing model (e.g., in the form of a pre-trained language model) to obtain output path to fine tune and create the final commonsense contextualizing model. Advantageously, using a pre-trained model enables leveraging the semantic understanding present in a pre-trained natural language model itself to produce novel entities and concepts as commonsense knowledge as it is not strictly tied to the entities in the knowledge graph used for training it owing to its generative nature.

Advantageously, this framework adapts to text input in downstream tasks since it does not suffer from train-inference input distribution shift, as other commonsense generative models face. Further, commonsense context generated can be directly used in a variety of natural language processing tasks as it takes a sentence as input without the need of entity/concept extraction as in prior methods. Moreover, this framework enables achieving accuracy using less training data, thereby reducing computing resources used to train such a commonsense contextualizing model described herein.

The trained commonsense contextualizing model can then be used to generate or infer commonsense contexts. Such commonsense contexts are generally in the form of a commonsense path, including a sequence of entities and relations. Advantageously, the trained commonsense contextualizing model is task agnostic and can be used to generate on-demand commonsense knowledge from a given text (e.g., natural language sentence) for any downstream application (e.g., question-answering). For example, given a text input of "years of playing tennis can lead to," the trained commonsense contextualizing model can generate inferences such as "foul_line isPartOf tennis_game hasSubEvent played_on_court causes injury." Such commonsense contexts, or commonsense paths, can be used in various natural language processing tasks, such as conversational bots, dialogue agents, information retrieval, question answering, and the like. The commonsense contexts augmented as additional context to text input enable improvement of performing such natural language processing tasks.

Turning to FIG. 1, FIG. 1 is a diagram of an environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

Operating environment 100 shown in FIG. 1 is an example of one suitable operating environment. Among other components not shown, operating environment 100 includes a number of user devices, such as sentence source device 102A and path source device 102B, network 104, commonsense contextualizing system 106, and a natural language processing system 108. Each of the components shown in FIG. 1 may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of devices, servers, and other components may be employed within operating environment 100 within the scope of the present disclosure. Each may comprise a single device or multiple devices cooperating in a distributed environment.

Sentence source device 102A and path source device 102B can be any type of computing device capable of providing training sentences and training paths for training a commonsense contextualizing model. With regard to the sentence source device 102A, the sentence source device 102A generally can provide any number of training sentences, for example, for use by the commonsense contextualizing system 106. As one example, a sentence source device may be a device of a web service that includes an extensive amount of sentences (e.g., Wikipedia®web service). The path source device 102B can generally provide any number of training paths, for example, for use by the commonsense contextualizing system 106. As one example, the path source device 102B can be a device of a knowledge graph service (e.g., a commonsense knowledge graph service) that provides a knowledge graph having various entities and relations therebetween.

In accordance with embodiments herein, the commonsense contextualizing system 106 can facilitate identification of commonsense context, generally in the form of commonsense inference paths. To do so, the commonsense contextualizing system 106 trains and uses a commonsense contextualizing model using mappings or pairs of contextually-related paths and sentences. In this way, commonsense contextualizing system 106 can obtain sentences via sentence source device 102A and paths via path source device 102B. Based on the obtained sentences and paths, training path-sentences pairs can be generated and used for training the commonsense contextualizing model. As described herein, the commonsense contextualizing model training can be based on a pre-trained language model. The trained commonsense contextualizing model can then be used to generate commonsense context, for example in the form of commonsense inference paths, for text input to the model. By way of example only, upon obtaining an input text, the commonsense contextualizing system 106 can generate commonsense context 110. As shown in FIG. 1, commonsense context 110 includes a commonsense inference path including a set of entities and relations therebetween. The commonsense context 110, and/or the text input, can be provided to the natural language processing system 108 for use in performing a natural language processing task(s). In some cases, the text input is text provided from a task specific dataset to train the task specific model with generated commonsense. In other cases, the text input is provided by a user.

The natural language processing system 108 is generally configured to use commonsense context, such as commonsense context 110, generated by the commonsense contextualizing system 106 to enhance performance of natural language processing tasks. A natural language processing system 108 may be used to perform any number of natural language processing tasks, such as, for example, conversational bot tasks, dialogue agent tasks, information retrieval tasks, question answering tasks, and the like. By way of example only, the natural language processing system may expand context in search use cases in which commonsense context generated via commonsense contextualizing system 106 is used to expand a query provided by a user. The expanded query(s) can be suggested as different query recommendations or query autocompletion suggestions that the user might want to utilize for a search. Additionally or alternatively, the commonsense context may be directly used to retrieve more diverse and relevant results, thereby helping to refine user's intent to discover desired results faster. For instance, given a particular query, the commonsense contextualizing system can provide multiple commonsense inference paths, which can be used to augment the search query to expand the context for better search results. As another example, the natural language processing system may perform question answering services or chatbot tasks. In such cases, the natural language processing system augmented with commonsense can be useful in improving accuracy of the answer reply and response generated by the system. As yet another example, the natural language processing system may perform text content authoring applications (e.g., email authoring). In such cases, the author's text content can be provided as input to a commonsense contextualizing model while the author is writing text and the output can be provided as creative suggestions to the author to assist and enhance the quality of the text content.

The commonsense contextualizing system 106 and the natural language processing system 108 include one or more processors, and one or more computer-readable media. The computer-readable media includes computer-readable instructions executable by the one or more processors. The instructions may optionally implement one or more components of commonsense contextualizing system 106 and the natural language processing system 108, described in additional detail below.

Figure 2:
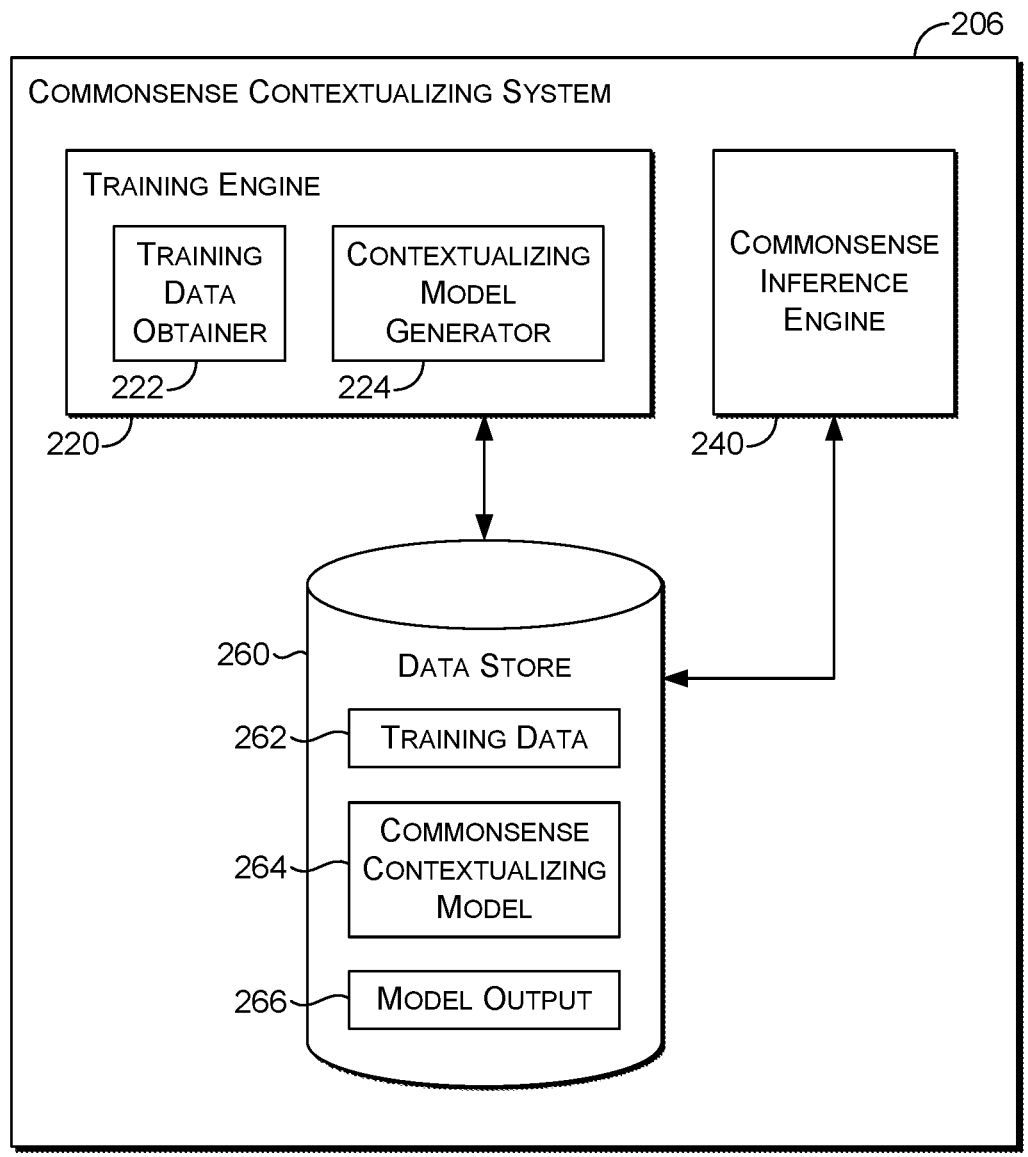
FIG. 2 depicts an illustrative commonsense contextualizing system, in accordance with various embodiments of the present disclosure.

Referring to FIG. 2, aspects of an illustrative commonsense contextualizing system are shown, in accordance with various embodiments of the present disclosure. Commonsense contextualizing system 206 includes training engine 220, commonsense inference engine 240, and data store 260. The foregoing components of commonsense contextualizing system 206 can be implemented, for example, in operating environment 100 of FIG. 1.

Data store 260 can store computer instructions (e.g., software program instructions, routines, or services), data, and/or models used in embodiments described herein. In some implementations, data store 260 stores information or data received via the various components of training engine 220 and/or commonsense inference engine 240 and provides the various components with access to that information or data, as needed. Although depicted as a single component, data store 260 may be embodied as one or more data stores. Further, the information in data store 260 may be distributed in any suitable manner across one or more data stores for storage (which may be hosted externally).

In embodiments, data stored in data store 260 includes training data 262. Training data generally refers to data used to train a commonsense contextualizing model, or portion thereof. As such, training data 262 can include training sentences, training paths, training path-sentence pairs, and/or or the like. In some cases, commonsense contextualizing system 206 can receive data from user devices (e.g., received from user device via, for example, application 110 of FIG. 1). Additionally or alternatively, commonsense contextualizing system 206 can receive data from other systems or components (e.g., a source of training sentences, a source of training paths, a source that provides a knowledge graph, etc.). In yet other cases, data can be received from one or more data stores in the cloud. Such obtained data may be stored in the data store 260.

Data store 260 can also be used to store commonsense contextualizing model 264. Such a commonsense contextualizing model can be comprised of one or more models (e.g., a pre-trained language model), which can also be stored in data store 260. Data store 260 may also store model output 266, which may include any output, such as commonsense context, for example, in the form of commonsense paths, and corresponding probabilities. Any other data computed by or used by commonsense contextualizing model 264, and/or aspects associated therewith, may be stored in data store 260 or any other data store accessible to the commonsense contextualizing system 206.

Training engine 220 is generally configured to train models, such as a commonsense contextualizing model. Such a commonsense contextualizing model can be used to predict or estimate commonsense context associated with input text (e.g., a sentence). As previously described, in embodiments, a commonsense contextualizing model generally utilizes commonsense knowledge graph data to predict or estimate a commonsense context for a text input. Accordingly, the training engine 220 utilizes training path-sentence pairs to generate or train a commonsense contextualizing model for subsequent use in predicting commonsense context for input text. As described herein, the training path-sentence pairs can be generated by identifying sentences that are contextually related to paths generated via a knowledge graph (e.g., a commonsense knowledge graph). Accordingly, a dataset used to train the commonsense contextualizing model includes sentences mapped to corresponding commonsense-relevant sub-portions of an underlying knowledge graph.

In one embodiment, as described herein, the commonsense contextualizing model is based on a pre-trained language model. Utilizing a pre-trained language model enables use of a larger vocabulary as compared to the knowledge graph from which the training paths are derived.

As depicted in FIG. 2, training engine 220 includes a training data obtainer 222 and contextualizing model generator 224. Although such components are illustrated separately, as can be appreciated, the functionality described in association therewith can be performed by any number of components.

The training data obtainer 222 is generally configured to obtain training data (e.g., training path-sentence pairs) for use in training a commonsense contextualizing model. Training data generally refers to any type of data used to train a commonsense contextualizing model. As described herein, training data may include, by way of example, training paths, training sentences, and/or training path-sentence pairs. Training paths generally refer to commonsense paths used for training a commonsense contextualizing model. Training sentences generally refer to sentences that are used for training a commonsense contextualizing model. Training path-sentence pairs refer to pairs of contextually-related paths and sentences used for training a commonsense contextualizing model.

Generally, and as described herein, training path-sentence pairs can be generated using training paths and training sentences. At a high level, the training path-sentence pairs include a path that contains commonsense knowledge (the knowledge source for generating the path based on common sense) linked or associated with a sentence. The training path-sentence pairs advantageously provide commonsense knowledge to sentences that the sentences do not otherwise capture. As such, the commonsense knowledge, or paths, provide context that would be implicitly captured by a human. Using the training path-sentence pairs to train a commonsense contextualizing model enables the model to subsequently identify commonsense context for text (e.g., sentences).

As described, the training data obtainer 222 may obtain training paths. Training paths may be obtained in any number of ways. In one embodiment, training paths may be identified using a knowledge graph. In this way, training paths may be structured knowledge paths. A knowledge graph generally refers to a knowledge base that uses a graph-structured data model or topology to integrate data. Knowledge graphs often store interlinked descriptions of entities (e.g., objects, events, situations, or abstract concepts) with free-form semantics. Knowledge graphs generally include nodes that represent entities, which are connected via edges or links representing relations. In embodiments, a knowledge graph may be a commonsense knowledge graph. A commonsense knowledge graph generally refers to a knowledge base that includes facts about the everyday world that all humans are expected to know. One example of a commonsense knowledge graph is ConceptNet. ConceptNet refers to a semantic network based on information in the Open Mind Common Sense (OMCS) database. ConceptNet is expressed as a directed graph with the nodes representing concepts and the edges representing assertions of common sense about the concepts. Concepts, also referred to as entities, can be terms or phrases (e.g., natural language phrases, such as noun phrases, verb phrases, adjective phrases, or clauses).

To identify training paths (e.g., structured knowledge paths) using a knowledge graph, such as a common sense knowledge graph, a reverse mapping from structured paths in the knowledge graph may be performed. In this regard, a random walk can be performed in a knowledge graph, such as ConceptNet, to extract a set of training paths, such as a set of multi-hop paths. A path, such as a training path, generally includes a set of entities (e.g., words) and a set of relations. A multi-hop path generally refers to a path having multiple hops, edges, or relations. A relation generally connects a pair of entities through a labeled edge. In embodiments, a relation conveys a semantic relationship between the entities. By way of example only, assume a path is 'atlas_atlocation map usedTo choose_route_hasPrerequisite walk'. Here, atlocation, usedTo and hasPrerequisite are examples of relation.' In this example, "atlocation," "usedTo," and "hasPrerequisite" are examples of relations. "_" denotes an inverse relation (i.e., the entities it connects are read in reverse order). In this example, "map usedTo choose_route" includes "map" and "choose_route" as entities connected through a "usedTo" relation.

A set of multi-hop paths may include any number of paths, $P=\{p_1, p_2, \ldots p_n\}$. In one embodiment, the length of each path, or the number of hops, is constrained in a particular range of $[k_1, k_2]$, such as $k_1=2$ and $k_2=5$. Maintaining the multi-hop paths to paths having between two and five hops enables identification of more relevant entities within a path. For example, the further away two entities are in a path, the less likely the entities are related to one another. In some implementations, to avoid paths that do not convey useful information and/or to filter noise, a relational heuristics can be used to remove generic relations. For example, edges comprising of a generic relation that do not convey useful information are removed. Accordingly, while sampling paths, paths which contain such edges are automatically filtered out. As such, in some embodiments, the size of the number of paths P may be approximately 28 million training paths. Training paths and/or a knowledge graph from which training paths are derived may be stored, for example, in association with data store 260.

To obtain sentences, the training data obtainer 222 can extract sentences from an electronic source(s) having a set of sentences. One example of an electronic sourcing having an extensive amount of sentences is Wikipedia®. In this regard, the training data obtainer 222 may extract sentences from various Wikipedia® articles (~5 Million articles). Extracting sentences from the Wikipedia® articles can result in a set of about 93 Million sentences. Training sentences may be stored, for example, in association with data store 260. In embodiments, the training sentences are indexed. In one implementation, the training sentences can be indexed using Apache Solr™. Thereafter, the indexed sentences can then be used for identifying sentences corresponding to a path, as described in more detail below, to generate path-sentence pairs. The indexed corpus of sentences may be referred to as $S \in \{s_1, s_2, \ldots s_n\}$.

In accordance with obtaining training paths and training sentences, the training data obtainer 222 may generate training path-sentence pairs. As described, training path-sentence pairs generally refers to pairs of contextually-related paths and sentences used for training a commonsense contextualizing model. To generate training path-sentence pairs, a subset of sentences can be identified as corresponding with a path P.

Figure 3:
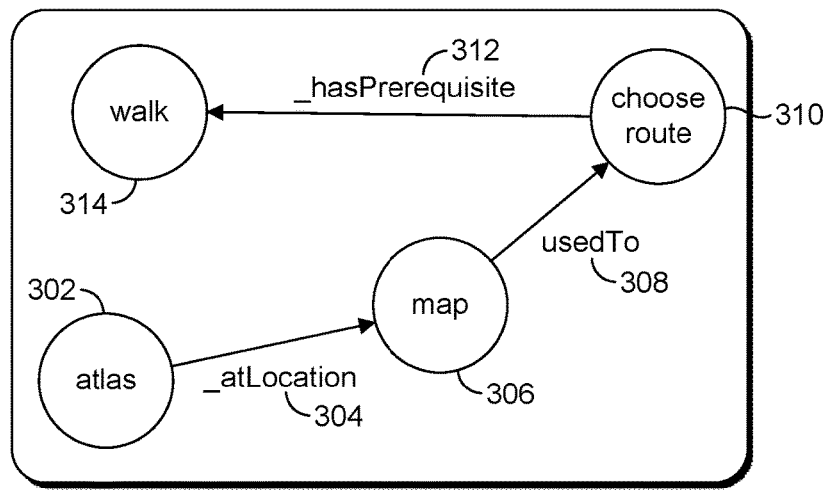
FIG. 3 depicts aspects of an example path derived from a commonsense knowledge graph, in accordance with various embodiments of the present disclosure.

As one example, to generate training path-sentence pairs, training paths in the set of training paths P can be mapped to sentences of the training sentences S to create a set of path-sentences pairs. In particular, to identify relevant sentences for a training path $p_i$, a query(s) can be extracted from $p_i$ according to query templates for use in identifying relevant sentences. As described, a training path may include any number of entities m and relations r. For example, a training path $p_i$ may contain m entities ($e_1, \ldots, e_m$) (e.g., words) and m–1 relations ($r_1, r_{m-1}$). A query template generally refers to a template used to generate a query from a training path. A query template may include any type of and number of entities of a path and/or relations in a path. One example of a query template, Q1, is used to extract non-contiguous entity-relations triples as queries from $p_i$ of the form $\{(e_i; r_i; e_{i+2})\}$ and $\{(e_i; r_{i+1}; e_{i+2})\}$. Query template Q1 can ensure relation information is captured while retrieving a sentence. Such query templates can include relations to achieve even more relevant sentences. By way of example only, and with reference to FIG. 3, FIG. 3 provides an example path derived from a commonsense knowledge graph. As shown in FIG. 3, the example path includes a first entity 302, followed by a first relation 304, second entity 306, second relation 308, third entity 310, third relation 312, and fourth entity 314. Assume i is a value of "2." In such a case, $e_i$ equals "map," and $r_i$ equals "used to." Further, as shown, $e_{i+2}$ equals "walk." As such, a query of the form $\{(e_i; r_i; e_{i+2})\}$ would include "map," "used to, and "walk."

Another example of a query template, Q2, is used to extract only connected entity pairs of the form $\{(e_i; e_{i+1})\}$. As can be appreciated, in some embodiments, an entire path is not considered while retrieving sentences in order to ensure better coverage as it is unlikely that a sentence contains all entities and relations present in a path. Advantageously, using such a query template based sentence retrieval implementation enforces a commonsense contextualizing model to both extrapolate and interpolate concepts while generating a path given a paired sentence as input. Although example query templates are provided herein, any type and number of query templates may be used to generate queries from training paths.

The queries generated from a training path can then be used to identify candidate sentences corresponding with the training path. In particular, sentences containing entities (e.g., words) and/or relations present in a query can be identified. In this manner, the sentences containing these words should be relevant to the path. For example, for each query q determined from a training path $p_i$ according to query templates Q1 and Q2, a set of indexed training sentences (e.g., via Apache Solr™) can be queried to identify training sentences containing entities present in q.

As can be appreciated, any number of training sentences may correspond with a training path as a result of applying queries from the training paths to the set of training sentences (e.g., indexed via Apache Solr™). As such, in some embodiments, the training data obtainer 222 may analyze the candidate training sentences identified in association with training path to identify more relevant training sentences relative to the training paths. To this end, the training data obtainer 222 may rank candidate sentences based on similarity between a sentence (e.g., via an embedding representing the sentence) and a training path (e.g., via an embedding representing the corresponding path p or query q associated therewith).

Comparing a sentence to a training path, or query associated therewith, can be performed in any number of ways. In one implementation, bidirectional encoder representations from transformers (BERT) may be used to identify more relevant training sentences associated with training paths. BERT generally refers to a transformer-based machine learning technique for natural language processing pre-training. BERT uses a cross-encoder in that two sentences are passed to the transformer network and a target value is predicted. Due to the extensive number of possible combinations, applications of BERT can be very resource intensive. As such, in some embodiments, sentence-BERT (SBERT) may be used to efficiently identify relevant training sentences associated with training paths. SBERT generally refers to a modification of the BERT network using Siamese and triplet networks that is able to derive semantically meaningful sentence embeddings (e.g., semantically similar sentences are close in vector space). The embeddings can then be compared, e.g., with cosine-similarity, to find sentences with similar meaning. In operation, a training sentence and a training path, or query associated therewith, can be input into SBERT, which outputs corresponding vectors that captures such information. The similarity of the vectors can then be determined based on distance between the two vectors. To this end, a smaller cosine distance generally indicates more similarity between the two vectors. Such distances can be used to identify a relevant training sentence to pair with a training path. For example, assume 20 sentences are identified as initially corresponding with a training path. Upon performing SBERT and comparing distances between vectors, a particular set of the 20 sentences may be identified as relevant to the training path and, as such, paired with the training path. For instance, a sentence identified as most relevant or most similar to the sentence may be selected. As another example, sentences having a similarity over a threshold value may be selected as relevant to the training path. As yet another example, a predetermined number of sentences (e.g., 10) with a highest similarity to a training path may be selected as relevant to the training path.

Alternatively or additionally, SBERT may be used to select training path-sentence pairs identified as most relevant. In this regard, each candidate training path-sentence pair may be passed through SBERT to identify an extent of similarity or relevance (e.g., cosine distance) between the training path and training sentence. Based on the similarities associated with each candidate training path-sentence pair, a particular set of candidate training path-sentence pairs can be designated or selected as path-sentence pairs to use for training. For example, candidate training path-sentence pairs having a similarity over a threshold value may be selected as path-sentence pairs to use for training. As another example, a predetermined number (e.g., 200K) candidate training path-sentence pairs with a highest similarity may be selected as path-sentence pairs to use for training.

A contextualizing model generator 224 is generally configured to generate or train a commonsense contextualizing model. A commonsense contextualizing model generally refers to a model (machine learning model) that provides or generates commonsense context or inferences for a text input (e.g., a sentence). In embodiments, the commonsense contextualizing model is trained to map a text input to a commonsense path for example, represented as $p=\{e_1, r_1, e_2, r_2, \ldots, e_n, r_n\}$. In embodiments, $e_1 \in E$ and $r_i \in R$, where R is the set of relations in a knowledge graph (e.g., ConceptNet). Further, $E = E_{KG} \cup Enovel$ where $E_{KG}$ represents the entities in the knowledge graph and $E_{novel}$ represents entirely novel concepts which include concepts present in input sentence but not in the knowledge graph.

At a high-level, the contextualizing model generator 224 can be trained utilizing training data, including training path-sentence pairs (e.g., obtained via training data obtainer 222). In this regard, training path-sentence pairs, which include sentences and corresponding paths indicating commonsense context, can be used to train the commonsense contextualizing model such that the commonsense contextualizing model can generate a set of commonsense contexts (e.g., commonsense paths) given text. As described herein, such commonsense context can augment the input sentence to perform downstream tasks, such as conversational bots, dialogue agents, information retrieval, question answering, etc. Various machine learning techniques may be used to train a commonsense contextualizing model. Further, a commonsense contextualizing model may be of various types of machine learned models (e.g., a generative framework, among others).

In one embodiment, to train the common sense contextualizing model, a pre-trained language model is used. In particular, a pre-trained language model (e.g., pre-trained network weights) can be used to leverage textual knowledge and semantic understanding possessed by the pre-trained language model. As such, the contextualizing model generator 224 can fine tune pre-trained network weights of a pre-trained language model. A pre-trained language model may initially train on a large corpus for learning language structure, grammar, semantics, etc. A language model generally refers to a model that analyzes historical parts of sentence and predicts the next word in the sentence.

One example of a pre-trained language model that may be used as a basis for training the commonsense contextualizing model is a text-to-text-transfer-transformer model (also referred to as a T5 model). A T5 model generally reframes natural language processing tasks into a unified text-to-text-format where the input and output are text strings. As T5 is a trained model that uses text input and outputs text, the targets (path strings that the model is trained to generate token by token given the relevant sentences as input) were designed to produce a sequence that tries to output one word through final feed-forward and softmax out the output level.

As such, in embodiments, the contextualizing model generator 224 can fine tune a T5 model, or other pre-trained language model, to achieve a task of converting a sentence to a path or, stated differently, generating a commonsense path from a natural language sentence. To train a pre-trained language model, such as T5, the contextualizing model generator 224 can input training path-sentence pairs into the pre-trained language model. In particular, a training sentence can be input into the pre-trained language model to generate a corresponding commonsense inference path. In some embodiments, the input sentence can correspond with an indication to generate a path. For example, a prefix, such as "convert sentence to path" can be appended before each sentence input to the pre-trained language model.

Given a sentence s as input into the pre-trained language model, the model can be fine-tuned to generate a commonsense inference path. Generally, the commonsense inference path can be generated by generating various path tokens at various time-steps of the model. In this regard, a path token $p_t$ can be generated at decoder time-step t by jointly conditioning over encoder outputs and past tokens in the past $p_{<t}$ using cross-entropy loss. By way of example only, assume a sentence of a training path-sentence pair is input to a T5 encoder of a T5 pre-trained language model. In such a case, at each time-step, an output path token is generated. The output path token may represent an entity or a relation of a commonsense inference path. The aggregate or concatenation of the path tokens represent the commonsense inference path output from the model.

To train the model, a loss function, such as cross-entropy loss, may be used. Stated differently, the model can be trained by evaluating loss to determine any errors or discrepancies. Errors can include inaccuracies, flaws, variations, and/or divergences between the training output and the desired output, often referred to as the ground-truth or output if the model or network was perfectly trained. This desired output may be reflected as the training path of the training path-sentence pair and used for comparison with the training output commonsense inference path. In some embodiments, updating or training the model involves feeding errors back through the model so the algorithm can adjust parameters in order to reduce the value of the error. Although a cross-entropy loss function is generally described herein, any type of loss function may be used to train the model.

In some embodiments, the contextualizing model generator 224 applies masking during training of the commonsense contextualizing model. Masking generally refers to hiding or removing a portion of input (e.g., replacing with a mask token). As such, in implementations, the contextualizing model generator 224 can select an entity (e.g., randomly select an entity) that co-occurs in an input sentence and target paths and mask the entity in the input sentence. Such a masking may be performed for only a particular number or portion of sentences in the data set. A hyper-parameter, $p_{mask}$, that is a parameter having a value used to control the learning process, can be used to control the masking. In particular, the hyper-parameter, $p_{mask}$, denotes the probability of masking an entity in the input sentence that originally co-occurs in the target path. For example, assume 100 sentences exist and a $p_{mask}$ value is 0.6. As such, masking of an entity would be performed in 60 sentences.

In implementations using masking, the model is trained to generate a commonsense inference path that also contains the masked entity. Advantageously, masking can be used to induce an inductive bias in the common sense contextualizing model to identify the masked entity while relating it with other concepts during path generation. In some cases, the $p_{mask}$ may be a default value. In other cases, $p_{mask}$ may be a predetermined. For example, $p_{mask}$ may be a predetermined value to ensure that generating context-relevant paths is not mitigated. To this end, both qualitative and quantative analysis of the commonsense contextualizing model can be performed across different values of $p_{mask}$.

Turning to the commonsense inference engine 240, the commonsense contextualizing model can be used to predict or infer commonsense context, or inference paths, for input text (e.g., sentences). In this regard, the commonsense inference engine 240 can use the trained commonsense contextualizing model to predict, infer, or identify a commonsense inference path for a text input. In execution, the commonsense contextualizing model may output any number of commonsense inference paths for a sentence and corresponding probabilities.

Figure 4:
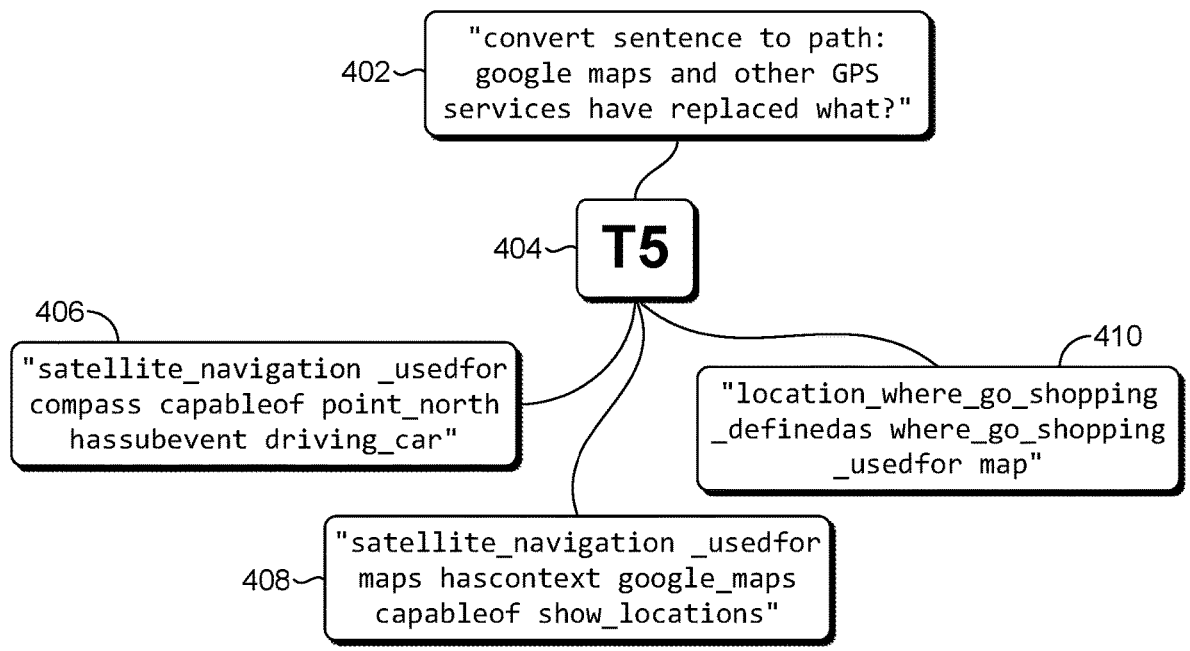
FIG. 4 provides an example illustration of an input sentence provided into a commonsense inference engine, in accordance with embodiments of the present disclosure.

By way of example, and with reference to FIG. 4, FIG. 4 illustrates an input sentence 402 into a commonsense inference engine 404. The commonsense inference engine can output various commonsense inference paths relevant to the input sentence 402. For example, the commonsense inference engine can generate or output commonsense inference path 406, commonsense inference path 408, and commonsense inference path 410. With reference to commonsense inference path 406, "satellite" and "navigation" reflect s single entity combined with an underscore. The term "compass" is the next entity in the commonsense inference path. The first entity and the second entity are linked via the relation "_usedfor." The underscore preceding "used for" can be used to indicate direction. For example, in this case, the underscore indicates that the "compass" is "used for" "satellite navigation." Without the direction indicator of the underscore, the commonsense inference path would indicate that "satellite navigation is" used for "compass."

In some cases, the commonsense inference engine 240 may provide each of the output commonsense inference paths in association with the input sentence. For example, each of the commonsense inference paths and corresponding sentence may be provided to a natural language processing engine that utilizes the commonsense inference paths to enrich the dataset. As another example, the commonsense inference engine 240 may provide a portion of the commonsense inference paths in association with an input sentence. For example, the commonsense inference engine may analyze the output commonsense inference paths and select a set of paths to provide (e.g., commonsense inference paths identified as having a highest relevance to a sentence). Such commonsense inference paths and corresponding sentences can be stored, for example in datastore 266.

In some embodiments, the commonsense inference engine 240 may employ a decoding strategy to generate diverse, or unique, outputs during inference. For example, to maximize the additional contextual knowledge obtained from paths for each sentence during a downstream task, multiple commonsense inference paths may be generated via the commonsense inference engine 240. In order to maximize the diversity among paths while maintaining relevance to a sentence, a path-specific variant of beam search, diverse-path search, can be implemented. Diverse-path search can be used to ensure diversity of commonsense inference paths. As one example, diverse-path search ensures diversity by sampling a top-k most probable tokens (e.g., based on entity probabilities output at the first time-step) at the first level, or time-step, itself and then selecting the most probable path forward for each one of them, thus returning k paths. This approach is motivated by the fact that when sampling entities for a path, the initial entities influence the overall semantics of the path much more significantly than intermediate entities. Other variations of a diverse-path search may be employed to achieve diversity of commonsense paths. For example, a top-k most probable tokens may be selected at each time-step.

As can be appreciated, the trained commonsense contextualizing model may output a set of commonsense inference paths and corresponding probabilities. As such, the commonsense inference engine 240 may analyze the output and select or designate commonsense inference path(s) with the highest score(s) as commonsense context for the input text (e.g., sentence). In other cases, the commonsense inference engine 240 may designate a commonsense inference path(s) as commonsense context for the input text if the probability exceeds a threshold value. The commonsense inference engine 240 can identify commonsense context for input text in any number of ways, only some of which are provided as examples herein.

The commonsense inference engine 240 may initiate storage of the selected commonsense context(s) (e.g., common sense inference path) or each of the commonsense, and/or corresponding probabilities. Such an identified commonsense context(s) may alternatively or additionally be communicated to another component for utilization or further analysis. For example, commonsense context (e.g., in the form of commonsense inference paths) for a text may be provided to a downstream natural language processing system for use in performing natural language processing tasks.

Figure 5:
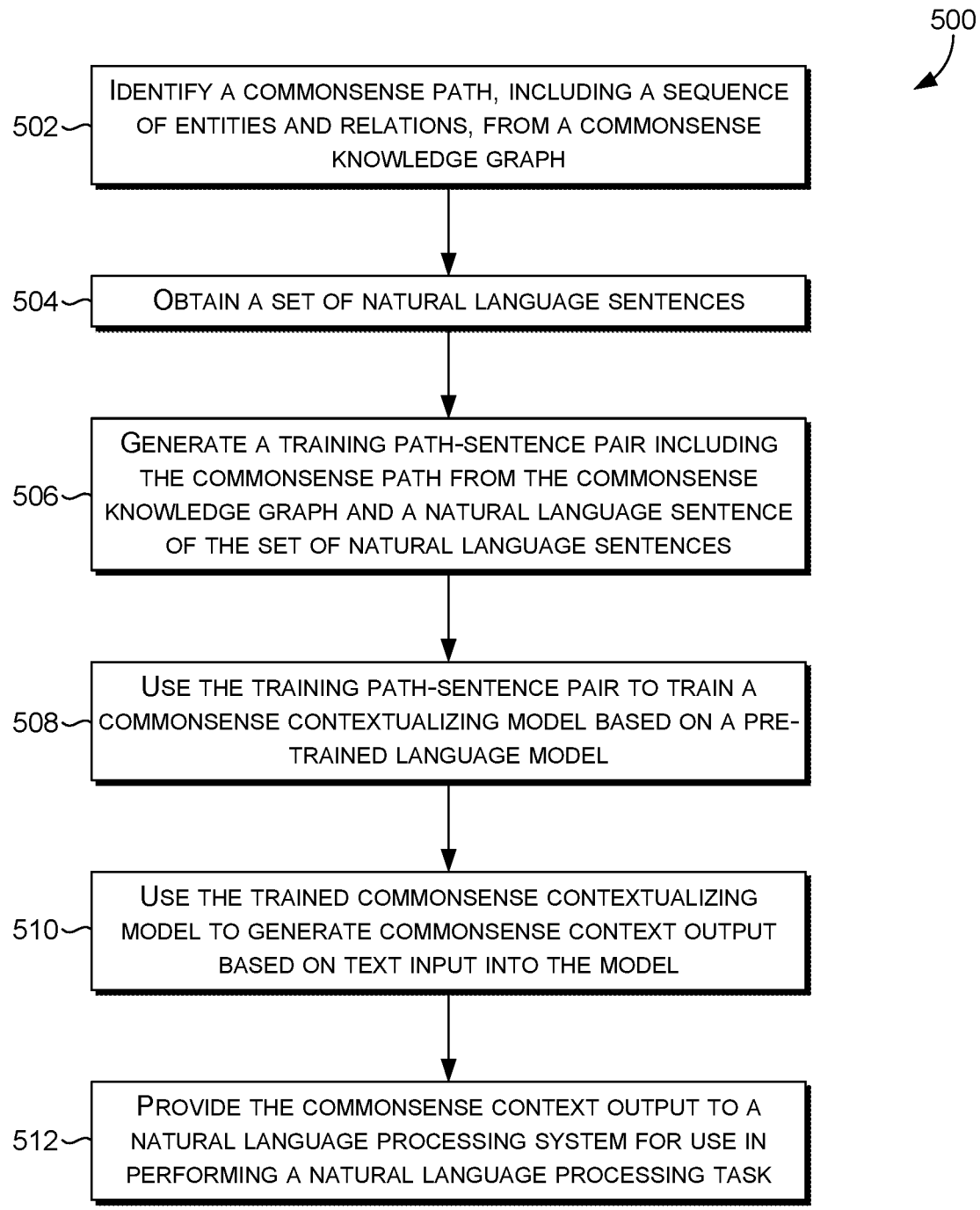
FIG. 5 illustrates an example method for generating and using a commonsense contextualizing model, in accordance with embodiments of the present technology.
Figure 6:
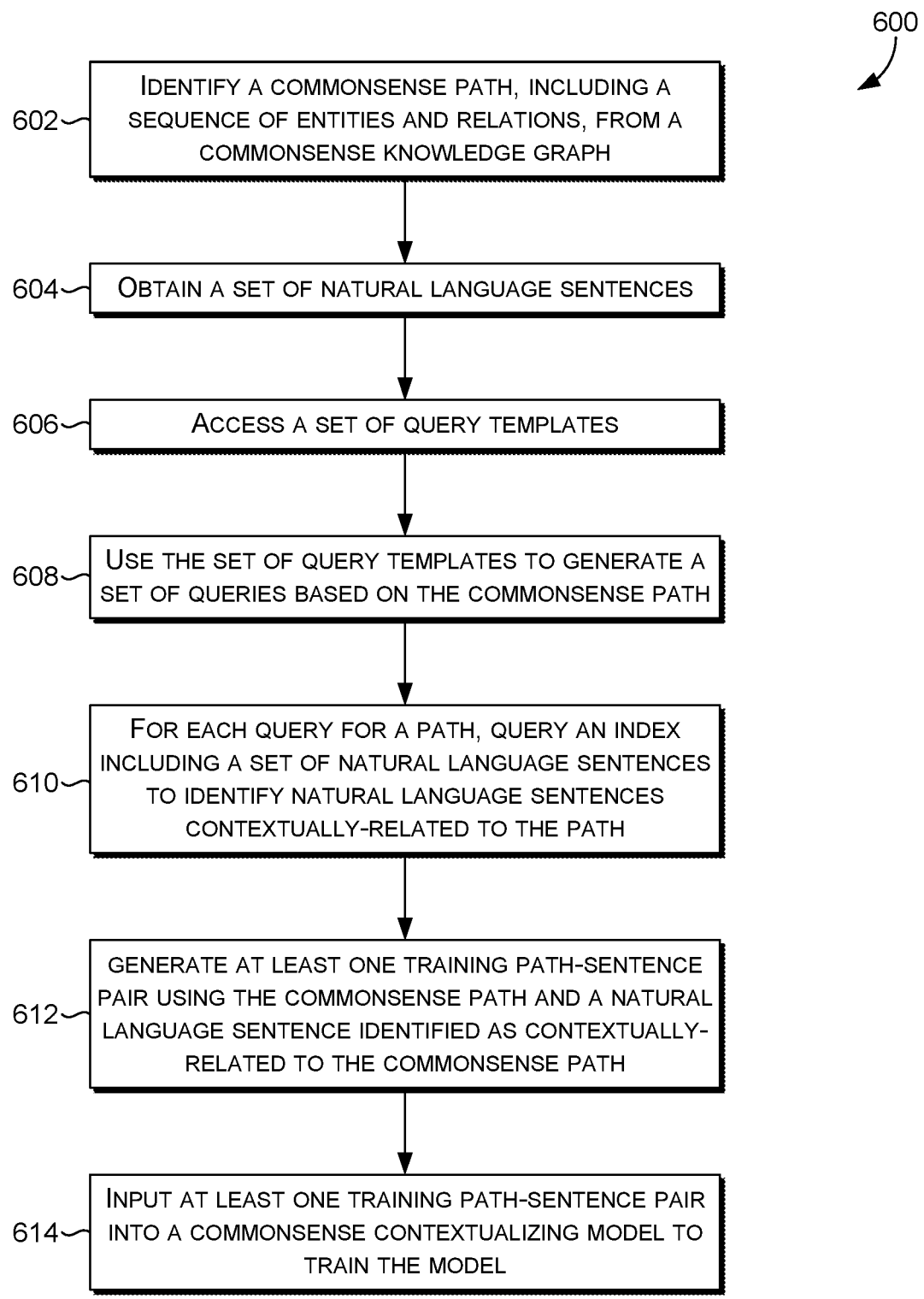
FIG. 6 illustrates an example method for training a commonsense contextualizing model, in accordance with embodiments of the present technology.
Figure 7:
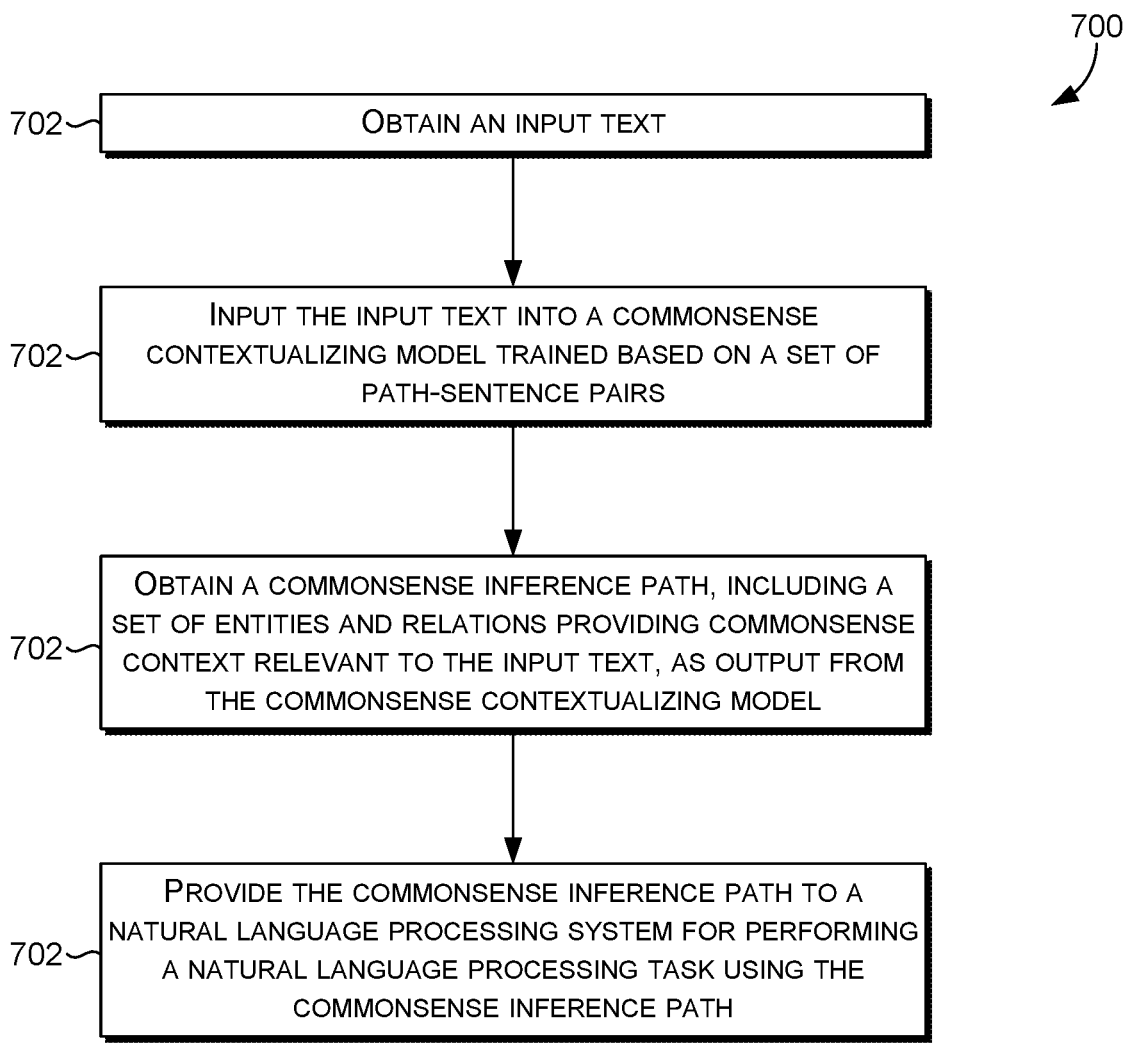
FIG. 7 illustrates an example method using a commonsense contextualizing model, in accordance with embodiments of the present technology.

Turning now to FIGS. 5-7, FIGS. 5-7 provide illustrative flows of methods for facilitating generation and/or utilization of commonsense contextualizing models, in accordance with embodiments described herein. With reference initially to FIG. 5, a process flow is provided showing an embodiment of method 500 for generating and using a commonsense contextualizing model, in accordance with embodiments of the present technology.

At block 502, a commonsense path, including a sequence of entities and relations, is identified from a commonsense knowledge graph. One example of a commonsense knowledge graph is ConceptNet. In embodiments, a commonsense path is identified from the commonsense knowledge graph based on an extraction of a set of multi-hop paths. The length of each path of the multi-hop paths may be within a predetermined range of hops (e.g., between 2 to 5 hops).

At block 504, a set of natural language sentences is obtained. Such natural language sentences can be extracted from an electronic source of sentences, such as Wikipedia®. At block 506, a training path-sentence pair including the commonsense path from the commonsense knowledge graph and a natural language sentence of the set of natural language sentences is generated. The natural language sentence is identified from among the set of natural language sentences based on the natural language sentence being contextually-related to the commonsense path based on at least one entity or relation associated with the commonsense path. In one embodiment, the natural language sentence is identified as contextually-related to the commonsense path based on a set of query templates used to generate queries for querying the set of natural language sentences. To do so, for example, a set of query templates may be accessed and used to generate a set of queries based on the commonsense path. Thereafter, an index having the set of natural language sentences may be indexed to identify the natural language sentence as matching at least one query of the set of queries.

At block 508, the training path-sentence pair is used to train a commonsense contextualizing model based on a pre-trained language model. In one embodiment, the training path-sentence pair is used to train the commonsense contextualizing model by inputting the training sentence into the pre-trained language model, and using an output commonsense inference path from the pre-trained model to compare to the commonsense path of the training path-sentence pair to fine tune the commonsense contextualizing model. As described herein, in some cases, training the commonsense contextualizing model includes performing masking of an entity in the natural language sentence that is also included in the commonsense path.

At block 510, the trained commonsense contextualizing model is used to generate commonsense context output based on text input into the model. The commonsense context output may be in the form of a commonsense inference path. Thereafter, the commonsense context output is provided to a natural language processing system for use in performing a natural language processing task, as indicated at block 512.

With reference to FIG. 6, FIG. 6 provides an example implementation for training a commonsense contextualizing model, in accordance with some embodiments of the present technology. Initially, at block 602, a commonsense path, including a sequence of entities and relations, is identified from a commonsense knowledge graph. One example of a commonsense knowledge graph is ConceptNet. In embodiments, a commonsense path is identified from the commonsense knowledge graph based on an extraction of a set of multi-hop paths. The length of each path of the multi-hop paths may be within a predetermined range of hops (e.g., between 2 to 5 hops).

At block 604, a set of natural language sentences is obtained. Such natural language sentences can be extracted from an electronic source of sentences, such as Wikipedia®.

At block 606, a set of query templates is accessed. A query template generally refers to a template used to generate a query from a training path. A query template may include any number of entities of a path and/or relations in a path. A query template can be accessed from a data store, for example. Thereafter, at block 608, the set of query templates is used to generate a set of queries based on the commonsense path. For example, multiple queries can be extracted from a path in accordance with query templates. At block 610, for each query for a path, an index including a set of natural language sentences is queried to identify natural language sentences contextually-related to the path. In some embodiments, a portion of natural language sentences identified as contextually-related to the path may be selected to identify the most relevant sentences.

At block 612, at least one training path-sentence pair is generated using the commonsense path and a natural language sentence identified as contextually-related to the commonsense path. The at least one training path-sentence pair is input into a commonsense contextualizing model (e.g., including a pre-trained language model) to train the model, as indicated at block 614. For example cross-entropy loss may be used to train the model.

Turning now to FIG. 7, FIG. 7 provides an example implementation for performing commonsense context identification using a commonsense contextualizing model, in accordance with some embodiments described herein. At block 702, an input text is obtained. As one example, the input text may be in the form of a sentence. At block 704, the input text is input into a commonsense contextualizing model trained based on a set of path-sentence pairs. In embodiments, each path-sentence pair includes a commonsense path identified via a commonsense knowledge graph and a natural language sentence identified as contextually-related to the commonsense path. Thereafter, at block 706, a commonsense inference path, including a set of entities and relations providing commonsense context relevant to the input text, is obtained as output from the commonsense contextualizing model. Any number of commonsense inference paths may be output for a sentence. As can be appreciated, a trained commonsense contextualizing model may output a set of commonsense inference paths and corresponding probabilities. As such, the output may be analyzed and used to select or designate commonsense inference path(s) with the highest score(s) as commonsense context for the input text (e.g., sentence). In other cases, a commonsense inference path(s) may be designated as commonsense context for the input text if the probability exceeds a threshold value. The commonsense inference path is provided to a natural language processing system for performing a natural language processing task using the commonsense inference path, as indicated at block 708. In some cases, a set of commonsense inference paths and corresponding sentences may be provided to a natural language processing engine that uses the commonsense inference paths to enrich the dataset.

Figure 8:
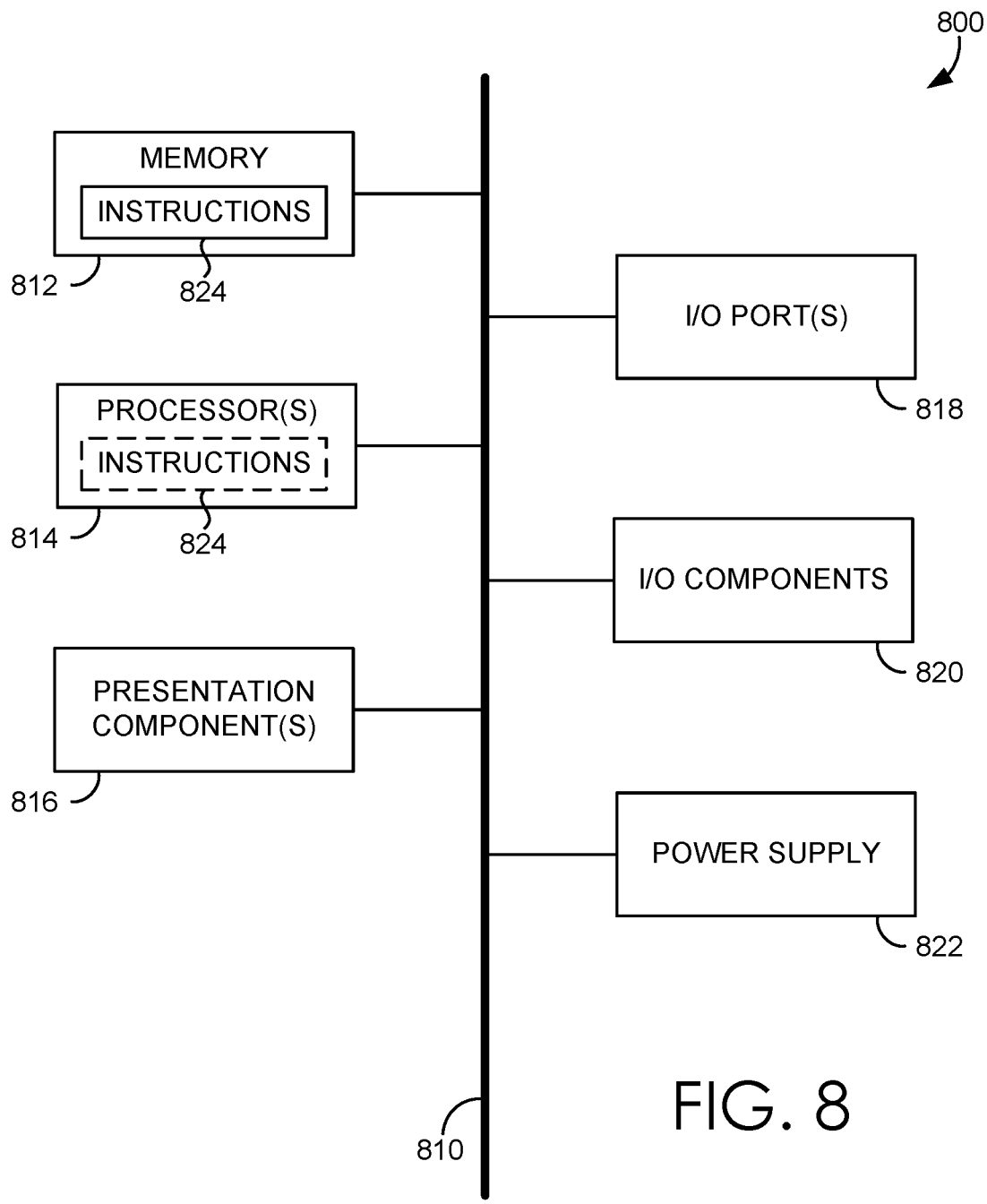
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present technology. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method comprising:
   generating a commonsense path derived using a commonsense knowledge graph, the commonsense path including a sequence comprising entities and relations;
   generating a training path-sentence pair including the commonsense path from the commonsense knowledge graph and a natural language sentence identified as contextually-related to the commonsense path based on at least one entity or relation associated with the commonsense path, wherein the natural language sentence is identified as contextually-related to the commonsense path using a query including an entity and a relation from the commonsense path generated via a query template to query a set of natural language sentences and obtain a subset of natural language sentences determined to be relevant to the query and using a model that derives semantically meaningful sentence embeddings to identify the natural language sentence, from the subset of natural language sentences, as within a threshold of similarity to the commonsense path;
   using the training path-sentence pair to train a commonsense contextualizing machine learning model comprising a pre-trained language model;
   using the commonsense contextualizing machine learning model to generate a commonsense inference path for an input text provided to the commonsense contextualizing machine learning model, the commonsense inference path including a sequence comprising entities and relations that provide commonsense context to the input text, the commonsense inference path generated by concatenating a set of path tokens, wherein each path token represents an entity or a relation at a corresponding time-step associated with the commonsense contextualizing machine learning model; and
   providing, to a natural language processing system, the input text and the commonsense inference path to augment the input text for use in performing a natural language processing task using at least the commonsense inference path.

2. The computer-implemented method of claim 1, wherein the commonsense path is identified from the commonsense knowledge graph based on an extraction of a set of multi-hop paths.

3. The computer-implemented method of claim 2, wherein the length of each path of the set of multi-hop paths is within a predetermined range of hops.

4. The computer-implemented method of claim 1, further comprising obtaining a set of natural language sentences, extracted from an electronic source of sentences, for use in generating a set of training path-sentence pairs including the training path-sentence pair.

5. The computer-implemented method of claim 1, wherein a set of query templates are used to generate a set of queries for querying the set of natural language sentences.

6. The computer-implemented method of claim 1, wherein the natural language sentence is identified as contextually-related to the commonsense path by:
accessing a set of query templates;
using the set of query templates to generate a set of queries based on the commonsense path; and
query an index having the set of natural language sentences to identify the natural language sentence as matching the query of the set of queries.

7. The computer-implemented method of claim 1, wherein the training path-sentence pair is used to train the commonsense contextualizing machine learning model by:
inputting the training sentence into the pre-trained language model; and
using an output commonsense inference path from the pre-trained model to compare to the commonsense path of the training path-sentence pair to fine tune the commonsense contextualizing machine learning model.

8. The computer-implemented method of claim 1, wherein training the commonsense contextualizing machine learning model includes performing masking of an entity in the natural language sentence, the entity also being included in the commonsense path.

9. One or more non-transitory computer-readable storage media having a plurality of executable instructions embodied thereon, which, when executed by one or more processors, cause the one or more processors to perform operations comprising:
obtaining an input text;
inputting the input text into a commonsense contextualizing machine learning model trained based on a set of path-sentence pairs, wherein each path-sentence pair includes a commonsense path identified via a commonsense knowledge graph and a natural language sentence identified as contextually-related to the commonsense path using a query generated to query a set of natural language sentences and obtain a subset of natural language sentences and using a model that derives semantically meaningful sentence embeddings to identify the natural language sentence, from the subset of natural language sentences, as within a threshold of similarity to the commonsense path;
obtaining, as output from the commonsense contextualizing model, a commonsense inference path including a set of entities and relations providing commonsense context relevant to the input text, the commonsense inference path generated by concatenating a set of path tokens, wherein each path token represents an entity or a relation at a corresponding time-step associated with the commonsense contextualizing model; and
providing the input text with the commonsense inference path to augment the input text to a natural language processing system for performing a natural language processing task using the commonsense inference path.

10. The media of claim 9, wherein the commonsense contextualizing machine learning model is trained using a pre-trained natural language model.

11. The media of claim 10, wherein the commonsense contextualizing machine learning model outputs a set of diverse commonsense inference paths.

12. The media of claim 11, wherein the set of diverse commonsense inference paths is generated based on sampling a predetermined number of most probable tokens at a first level associated with the commonsense contextualizing machine learning model and selecting a most probable path forward for each of the predetermined number of most probable tokens at the first level.

13. The media of claim 9, wherein the natural language processing system uses at least the commonsense inference path to perform the natural language processing task.

14. The media of claim 13, wherein the natural language processing task comprises at least one of a conversational bot task, a dialogue agent task, an information retrieval task, or a question answering task.

15. The media of claim 9, wherein the natural language sentence is identified as contextually-related to the commonsense path by:
accessing a set of query templates;
using the set of query templates to generate a set of queries based on the commonsense path; and
querying an index having the set of natural language sentences to identify the natural language sentence as matching the query of the set of queries.

16. A system comprising:
a processor device; and
a memory device, coupled with the processor device, the processor device to perform actions comprising:
training a commonsense contextual machine learning (ML) model by fine tuning a pre-trained language model based on a set of training path-sentence pairs, wherein each training path-sentence pair includes a commonsense path, identified via a commonsense knowledge graph and a natural language sentence identified as contextually-related to the commonsense path, wherein the natural language sentence is identified as contextually-related to the commonsense path based on a query, generated using a query template, to search a set of natural language sentences to identify a subset of natural language sentences and using a model that derives semantically meaningful sentence embeddings to identify the natural language sentence, from the subset of natural language sentences, as within a threshold of similarity to the commonsense path;
using the commonsense contextualizing ML model to generate a commonsense inference path for a text input into the commonsense contextualizing ML model, the commonsense inference path including a sequence comprising entities and relations that provide commonsense context to the text input, the commonsense inference path generated by concatenating a set of path tokens, wherein each path token represents an entity or a relation at a corresponding time-step associated with the commonsense contextualizing ML model; and
providing the text input with the commonsense inference path to augment the text input to a natural language processing system for use in performing a natural language processing task using the text and the commonsense inference path.

17. The system of claim 16, wherein the natural language processing task comprises at least one of a conversational bot task, a dialogue agent task, an information retrieval task, or a question answering task.

18. The system of claim 17, wherein the sequence included in the commonsense inference path includes a portion selected from the text input and a portion not included within the text input.

19. The system of claim 16, wherein the commonsense contextualizing ML model outputs a set of diverse commonsense inference paths that are provided to the natural language processing system for use in performing the natural language processing task.

* * * * *